(12) United States Patent
Akahori et al.

(10) Patent No.: US 7,136,194 B2
(45) Date of Patent: Nov. 14, 2006

(54) IMAGE PROCESSING APPARATUS, IMAGE FORMING APPARATUS, AND IMAGE PROCESSING METHOD

(75) Inventors: Taisuke Akahori, Toyokawa (JP); Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 974 days.

(21) Appl. No.: 10/073,924

(22) Filed: Feb. 14, 2002

(65) Prior Publication Data

US 2002/0118391 A1    Aug. 29, 2002

(30) Foreign Application Priority Data

Feb. 28, 2001   (JP)   ............... 2001-055769

(51) Int. Cl.
  G06K 15/00   (2006.01)
  G06K 9/34    (2006.01)
  G06K 9/46    (2006.01)
  H04N 1/40    (2006.01)
  H04N 1/409   (2006.01)

(52) U.S. Cl. .............. 358/2.1; 358/3.26; 382/176; 382/205

(58) Field of Classification Search ............. 358/2.1, 358/530, 504, 500, 515, 1.9, 3.06, 534, 3.26; 382/162, 176, 205
See application file for complete search history.

(56) References Cited

U.S. PATENT DOCUMENTS 6,449,060 B1 * 9/2002 Kawai et al. ............. 358/1.9

FOREIGN PATENT DOCUMENTS

| JP | 05-153393 | 6/1993 |
| JP | 09-247436 | 9/1997 |
| JP | 11-266360 | 9/1999 |
| JP | 2000-287077 | 10/2000 |

OTHER PUBLICATIONS

U.S. Appl. No. 09/369,176 "Halftone Dot Image Discrimination Method and Image Processing Device".
U.S. Appl. No. 09/568,669 "Image Processing Apparatus, Image Processing Method and Coomputer Program Product for Image Processing".

* cited by examiner

*Primary Examiner*—Kimberly Williams
*Assistant Examiner*—Charlotte M. Baker
(74) *Attorney, Agent, or Firm*—Buchanan Ingersoll & Rooney PC

(57) ABSTRACT

Disclosed are an image processing apparatus that can decrease such a misjudgment that an area including an extremely small-sized character is judged to be a halftone-dot area when a judgment of a halftone-dot area is performed based on a number of isolated pixels in a predetermined area, and an image forming apparatus that utilizes the image processing apparatus. An isolated pixel signal that is outputted from an isolated pixel detection unit and that indicates whether a target pixel corresponds to an isolated pixel is inputted into a filter processing unit. The filter processing unit corrects the isolated pixel signal based on whether the target pixel should be handled as an isolated pixel. A judgment is then performed as to whether an area including the target pixel is a halftone-dot area, based on a signal outputted from the filter processing unit.

12 Claims, 12 Drawing Sheets

FIG.1

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

"BAI" = 買

FIG.10

CONDITION(1)
| 0 | 1 | 1 |
| 0 | 1 | 1 |
| 0 | 0 | 0 |

CONDITION(2)
| 0 | 0 | 0 |
| 1 | 0 | 0 |
| 1 | 0 | 0 |

CONDITION(3)
| 0 | 0 | 0 |
| 1 | 1 | 0 |
| 1 | 0 | 0 |

CONDITION(4)
| 0 | 0 | 0 |
| 1 | 1 | 0 |
| 1 | 1 | 0 |

CONDITION(5)
| 0 | 0 | 0 |
| 1 | 1 | 0 |
| 0 | 1 | 0 |

CONDITION(6)
| 0 | 1 | 0 |
| 0 | 1 | 0 |
| 0 | 0 | 0 |

CONDITION(7)
| 0 | 0 | 0 |
| 0 | 1 | 1 |
| 0 | 0 | 0 |

CONDITION(8)
| 0 | 0 | 1 |
| 0 | 1 | 0 |
| 0 | 0 | 0 |

CONDITION(9)
| 0 | 1 | 0 |
| 0 | 0 | 0 |
| 1 | 0 | 0 |

CONDITION(10)
| 0 | 0 | 0 |
| 0 | 0 | 1 |
| 1 | 0 | 0 |

CONDITION(11)
| 0 | 0 | 1 |
| 0 | 0 | 0 |
| 1 | 0 | 0 |

IMAGE PROCESSING APPARATUS, IMAGE FORMING APPARATUS, AND IMAGE PROCESSING METHOD

This application is based on Patent Application No. 2001-55769 filed in Japan, the content of which is hereby incorporated by reference.

This application relates to the U.S. patent application Ser. No. 09/369,176, entitled "HALFTONE DOT IMAGE DISCRIMINATION METHOD AND IMAGE PROCESSING DEVICE", owned by the assignee of this application and incorporated herein by reference.

BACKGROUND OF THE INVENTION (1) Field of the Invention

The present invention relates to an image processing apparatus, and particularly to a technique for decreasing deterioration of image quality in an image forming apparatus that forms an image based on digital image data.

(2) Description of Related Art

In image forming apparatuses that form an image based on digital image data, various image processing such as smoothing and edge enhancement is generally employed to improve image quality. Such image processing is performed on pixels of image data in accordance with an image type, examples of which include a character image and a halftone-dot image. To be more specific, a pixel that is judged to be in a halftone-dot area is typically subjected to smoothing, and a pixel that is judged to be in an edge area of a character is typically subjected to edge enhancement.

Here, the following describes an example of a method for judging whether each of pixels included in image data is in a halftone-dot area or not. Each pixel is set as a target pixel to be judged. The first judgment is performed as to whether the target pixel corresponds to an isolated pixel or not, using a filter of a predetermined size including the target pixel as the center. Then, the second judgment is performed as to whether the target pixel is in a halftone-dot area or not, by counting the number of isolated pixels present in a predetermined area including the target pixel. Note here that isolated pixels are categorized into two: black isolated pixel; and white isolated pixel. A white isolated pixel is a pixel with high brightness that stands isolated in a background of pixels with low brightness, whereas a black isolated pixel is a pixel with low brightness that stands isolated in a background of pixels with high brightness. In either case, one or more isolated pixels can construct one dot in a halftone-dot area.

According to this halftone-dot area judgment method, an isolated pixel filter is used in the first judgment, an example of which is a filter consisting of 5 (vertical)*5 (horizontal) pixels as shown in FIG. 1. In this case, assuming brightness of a target pixel "V33" as "L33", brightness of a nearby pixel "V22" as "L22", and brightness of a nearby pixel "V23" as "L23", etc., the target pixel "V33" is judged to correspond to a white isolated pixel when at least one of the following conditions: inequality (1); inequality (2); and inequality (3), is satisfied.

Inequality 1

L33>MAX (L22, L23, L24, L34, L44, L43, L42, L32)

Inequality 2

L33>MAX (L11, L12, L13, L14, L15, L25, L35, L45, L55, L54, L53, L52, L51, L41, L31, L21)

Inequality 3

L33>MAX{ (L11+L22)/2, (L13+L23)/2, (L15+L24)/2, (L55+L44)/2, (L53+L43)/2, (L51+L42)/2}

Then, in the second judgment, a filter with a larger size than the above isolated pixel filter is used, an example of which is a filter consisting of 9 (vertical)*45 (horizontal) pixels including the target pixel, and the number of isolated pixels present therein is counted. When the count number of the isolated pixels is above a predetermined threshold, the target pixel is judged to be in a halftone-dot area.

However, the above conventional image processing apparatuses have the problem that a pixel in an image of a character may not be recognized correctly but may be misjudged to be a pixel in a halftone-dot area. This may occur, for example, when an extremely small-sized image of a character "TA" (a character with the Kanji attribute which means "rice field" in Japanese (see FIG. 2)) is present. If such a pixel is misjudged to be in a halftone-dot area, smoothing is performed on the pixel. As a result of unnecessary smoothing, it becomes impossible to expect output of a character that can be recognized as a small-sized image of a character "TA".

The following describes the above-mentioned misjudgment in more detail. FIG. 3A shows an example case where two extremely small-sized images of a character "TA" are present within a filter area consisting of 9 (vertical)*45 (horizontal) pixels as described above. In the example of the figure, each square is assumed to represent one pixel. In this case, according to the above conditions, solid black parts in FIG. 3B (32 pixels in total) are judged to correspond to isolated pixels.

Next, the following refers to an example of the number of isolated pixels to be detected in an actual halftone-dot area. FIG. 4A shows an example of a halftone-dot area in which white halftone-dots each consisting of 2 (vertical)*2 (horizontal) pixels are present sequentially. In the example of FIG. 4A, solid black parts shown in FIG. 4B are judged to correspond to isolated pixels, and therefore, the number of isolated pixels is 180 in total.

What should be noted here is that a size of a halftone-dot varies depending on each halftone-dot area. In some cases, a size of a halftone-dot may be much smaller than the above cases. FIG. 5A shows an example of a halftone-dot area in which white halftone-dots each consisting of one pixel are present at regular intervals. In the example of FIG. 5A, solid black parts shown in FIG. 5B are judged to correspond to isolated pixels, and therefore, the number of isolated pixels is 18 in total.

If a threshold of the number of isolated pixels is set in such a manner that the halftone-dot areas shown both in FIGS. 4A and 5A are correctly judged to be halftone-dot areas, therefore, pixels in an extremely small-sized image of a character "TA" shown in FIG. 3A are also judged to be pixels in a halftone-dot area.

SUMMARY OF THE INVENTION

In view of the above problem, the object of the present invention is to provide an image processing apparatus that can prevent pixels in an extremely small-sized character from being misjudged to be pixels in a halftone-dot area, and thereby decrease deterioration of image quality, and to provide an image forming apparatus that utilizes the image processing apparatus, and an image processing method.

The above object can be achieved by an image processing apparatus including: an acquisition unit for acquiring image data that includes a plurality of pixels; a first-judgment unit for setting each of the plurality of pixels as a first target pixel and performing a first-judgment as to whether the first target pixel is an isolated pixel for a judgment of a halftone-dot area; a first-judgment result correction unit for correcting results of the first-judgment, to determine isolated pixels to be used in a second-judgment; and a second-judgment unit for setting each of the plurality of pixels as a second target pixel and performing the second-judgment as to whether the second target pixel is in a halftone-dot area, by referring to the corrected results of the first-judgment.

According to this construction, because the isolated pixel signal is corrected to determine isolated pixels to be used, an area including an extremely small-sized character is less likely to be misjudged as a halftone-dot area. Therefore, deterioration of image quality can be decreased.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 1 shows an example case showing a window of 5*5 pixels set for a target pixel "V33";

FIG. 2 shows characters with the Kanji attribute "TA" and "BAI" respectively meaning "rice field" and "to purchase" in Japanese.

FIG. 10 shows examples of filters used by a filter processing unit 444;

DESCRIPTION OF THE PREFERRED EMBODIMENT

The following describes a preferred embodiment of an image processing apparatus and an image forming apparatus relating to the present invention, with reference to the drawings.

(1) Overall Construction of the Image Processing Apparatus

Figure 6:
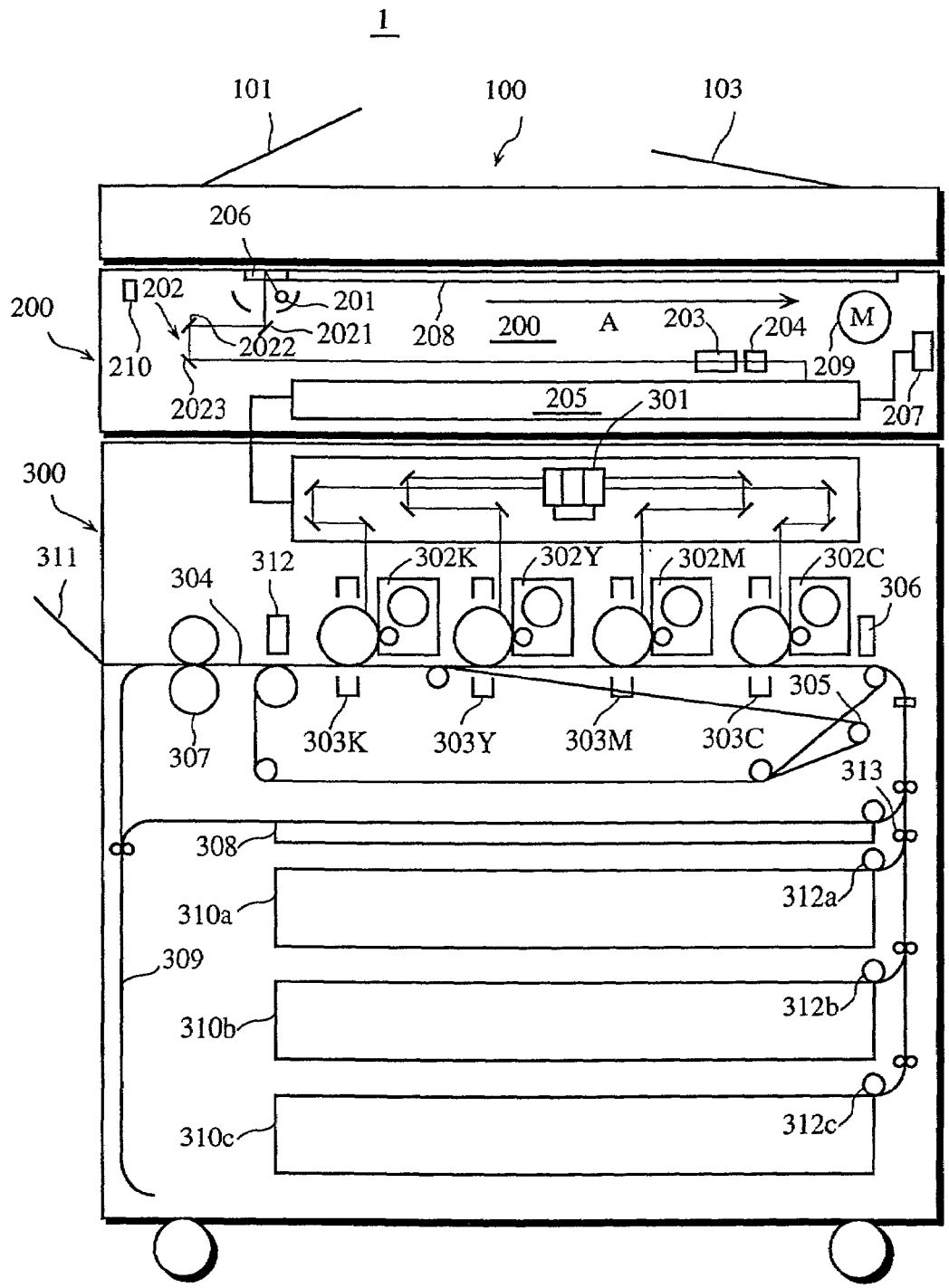
FIG. 6 is a schematic cross sectional view showing the overall construction of a copying machine 1.

FIG. 6 is a schematic cross sectional view showing the overall construction of a full-color copying machine 1 (hereafter simply referred to as a "copying machine") as one example of the image forming apparatus.

In the copying machine 1, an image forming unit 300 forms an image based on digital image data obtained by an image reading unit 200 reading a document. An automatic document feeder 100 is provided on the image reading unit 200. Here, an image is typically formed in the following way. A document is fed to an image reading position by the automatic document feeder 100 and is read by the image reading unit 200, and the obtained image data is transmitted to the image forming unit 300, which forms the image on a recording sheet. The copying machine 1 can be connected to external devices, such as a personal computer (PC), via an interface 207. This connection provides the copying machine 1 with additional features such as (a) scanner function for outputting image data read by the image reading unit 200 to an external device, and (b) printer function for receiving input of image data from an external device and forming an image by the image forming unit 300, based on the input image data.

The automatic document feeder 100 feeds a document placed on a document feed tray 101 to the image reading position of the image reading unit 200, and after the image is read, discharges the document to a document discharge tray 103. The document transportation operation is accomplished in accordance with instructions from a control panel (not shown), and the document discharge operation is accomplished in accordance with a reading end signal from the image reading unit 200. When a plurality of documents are stacked on the document feed tray 101, these control signals are continuously generated to sequentially transport the documents, read images of the documents, and discharge the documents.

In the image reading unit 200, an exposure lamp 201 illuminates the document placed on a document glass 208, and a mirror group 202 including three mirrors 2021 to 2023 and a lens 203 directs the light reflected by the document to form an image on a CCD sensor 204. The exposure lamp 201 and the first mirror 2021 are driven by a scan motor 209 in the direction of arrow A at a speed V corresponding to the magnification ratio, so as to scan the entire surface of the document placed on the document glass 208. While the document is being scanned using the exposure lamp 201 and the first mirror 2021, the second mirror 2022 and the third mirror 2023 move in the direction of arrow A at a speed V/2. The position of the exposure lamp 201 is calculated and controlled, using the amount of movement from the home position, i.e., using the number of steps of the scan motor 209 and detection signals from a scan home position sensor 210. The reflected light entering the CCD sensor 204 is converted into electric signals within the CCD sensor 204. The image processing unit 205 then subjects the electric signals to various image processing, such as analogue processing, analogue-to-digital (AD) conversion, and digital image processing, and then transmits the signals to the interface 207 or to the image forming unit 300. A white shading correction plate 206 is arranged in close proximity to the document reading start position of the document glass 208. Prior to reading of the document, the shading correction plate 206 is read to generate correction data for shading correction.

The following describes the image forming unit 300. First, exposure and imaging are described.

Image data transmitted from the image reading unit 200 or the interface 207 is converted into print data of each of colors C (cyan), M (magenta), Y (yellow), and K (black), and is transmitted to a control unit of each exposure head (not shown). The control unit of each exposure head makes a laser emit a laser beam in accordance with a pixel value of the transmitted image data, and performs a one-dimensional scan with the emitted laser beam via a polygon mirror 301, to optically expose the surface of a photoconductor in each of the imaging units 302C, 302M, 302Y, and 302K.

In each of the imaging units 302C to 302K, elements required for an electrophotographic process are arranged around the periphery of a photoconductor. The electrophotographic process is continuously performed as the photoconductor for each of C, M, Y, and K is rotated clockwise. The imaging units 302C to 302K necessary for forming an image each are integrated, and are detachable from the body. The latent images formed on the photoconductors in the imaging units 302C to 302K by the above exposure are developed by developing units of respective colors. The toner images developed on the surface of the photoconductors in the imaging units 302C to 302K are transferred onto a recording sheet transported on a paper transport belt 304, by transfer chargers 303C to 303K respectively arranged to face the photoconductors in the imaging units 302C to 302K within the paper transport belt 304.

The following describes the recording sheet feeding, transport, and fixing operations. The recording sheet onto which an image is to be transferred is fed to the transfer position in the following sequence and the image is formed on the recording sheet. Recording sheets of various sizes are loaded beforehand in paper feed cassettes 310a to 310c. A recording sheet of a desired size is fed to the transport path by a corresponding one of the paper feed rollers 312a to 312c respectively mounted on the paper feed cassettes 310a to 310c.

The recording sheet fed to the transport path is transported onto the paper transport belt 304 by a transport roller pair 313. Here, a reference mark on the paper transport belt 304 is detected by a timing sensor 306, so that a transport timing of the recording sheet is adjusted. Also, in the imaging units 302C to 302K, three registration correction sensors 312 are arranged along the main scanning direction furthest downstream in the direction of the transportation of the recording sheet. When a registration pattern is formed on the paper transport belt 304, the amount of color aberration is detected in the main scanning direction and the sub scanning direction of the C, M, Y, and K images by the registration correction sensors 312. Print image correction and image distortion correction are performed by a print image control unit (PIC unit). As a result, color aberration on the recording sheet can be prevented. The toner image transferred onto the recording sheet is fused and fixed thereon via heating by the fixing roller pair 307, and then the recording sheet is discharged to a discharge tray 311.

Note that in the case of duplex copies, an image is formed on the back side of the recording sheet in the following way. The recording sheet on which the toner image is fixed by the fixing roller pair 307 is inverted by a paper inverting unit 309, and is guided to a duplex unit 308, which re-feeds the recording sheet to the transport path. Note also that the paper transport belt 304 can be retracted from the imaging units 302C, 302M, and 302Y of colors C, M, and Y, by up-and-down movement of a belt retracting roller 305, so as not to contact the photoconductors therein. When a monochrome image is formed, therefore, the imaging units 302C, 302M, and 302Y are not driven. This can decrease wear of the photoconductors and the other elements in the imaging units 302C, 302M, and 302Y.

(2) Construction of the Image Processing Unit 205

Figure 7:
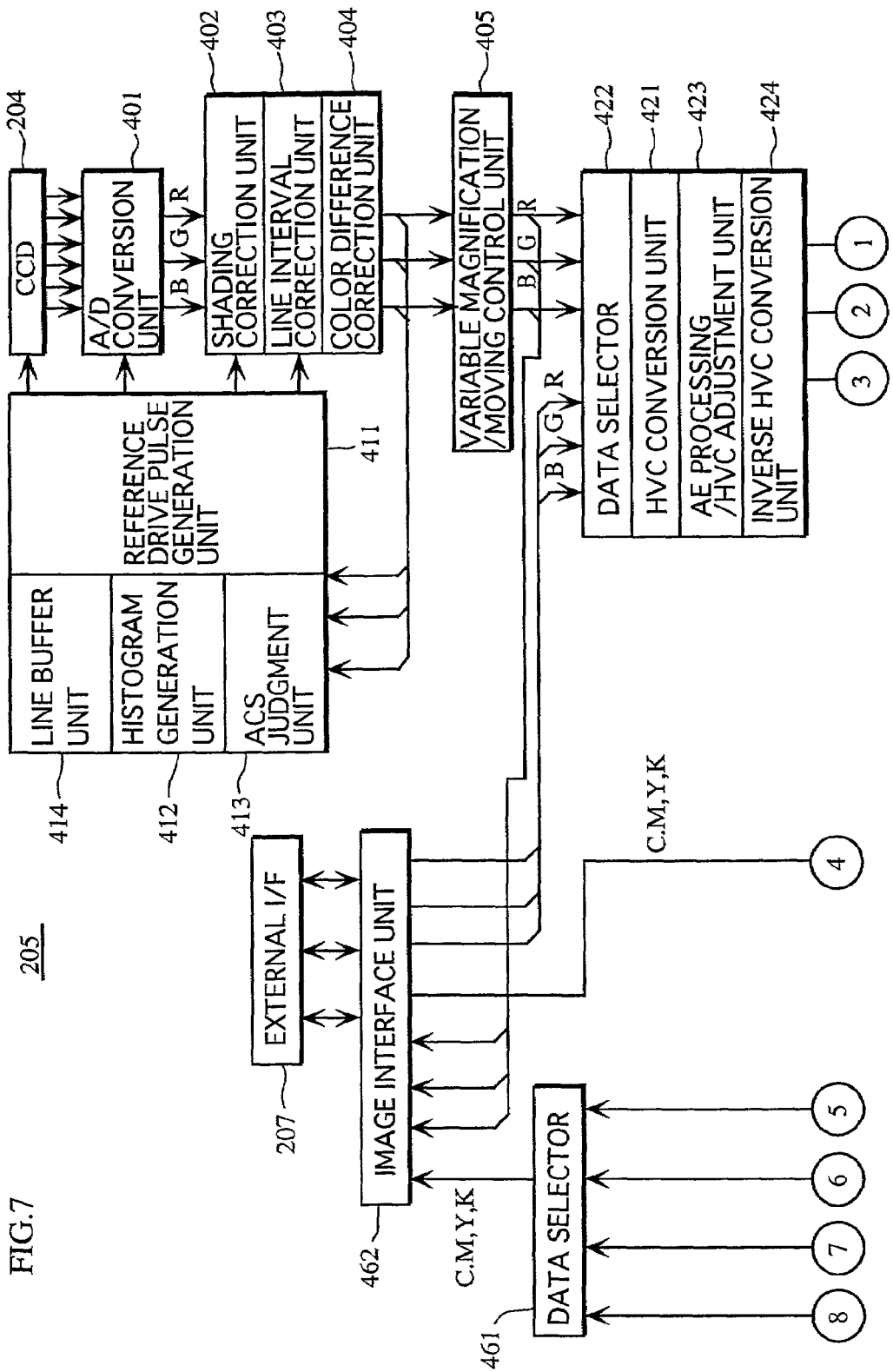
FIG. 7 is a functional block diagram showing the construction of an image processing unit 205.
Figure 8:
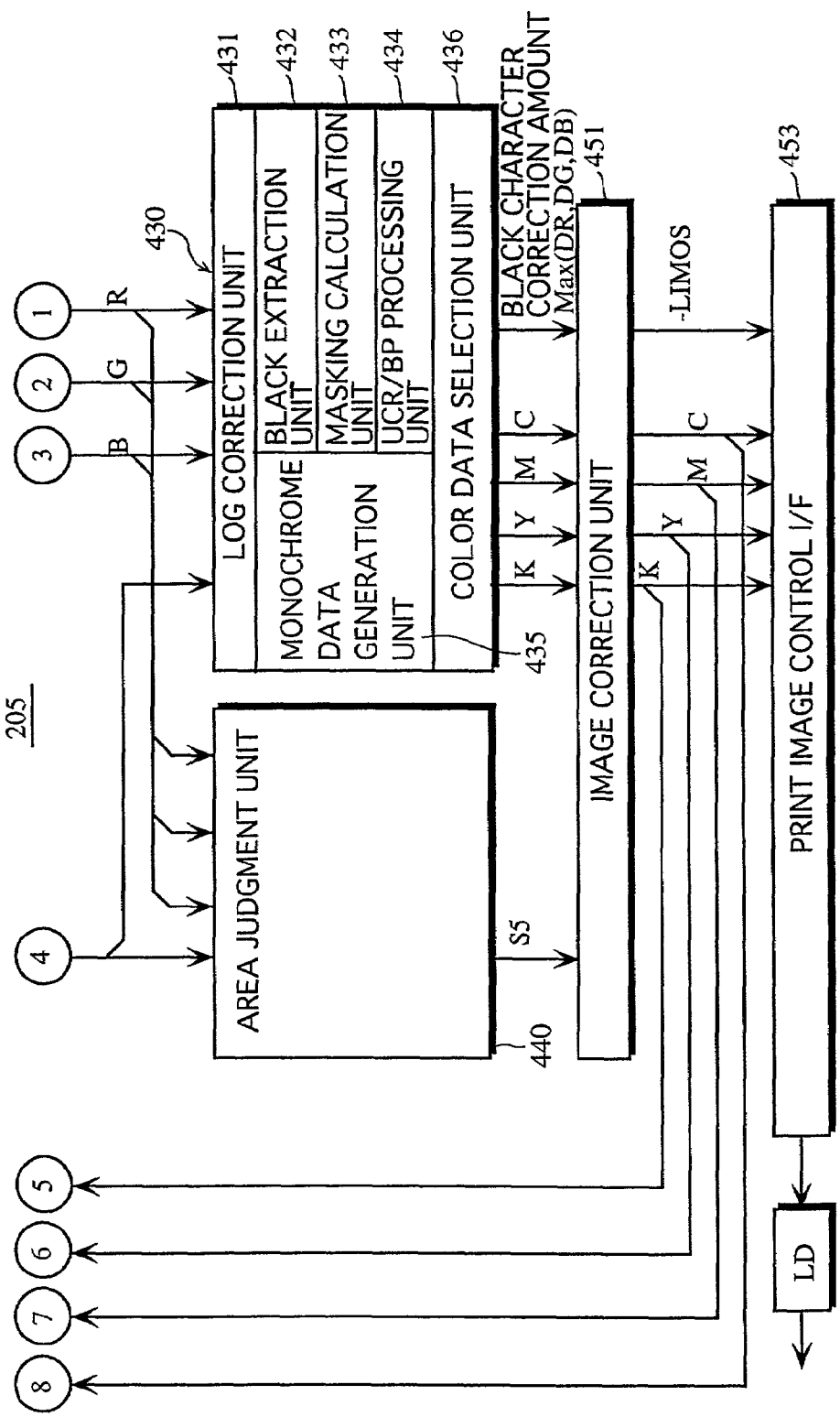
FIG. 8 is a functional block diagram showing the construction of the image processing unit 205.

The following describes the signal processing performed by the image processing unit 205 provided in the image reading unit 200. FIGS. 7 and 8 are functional block diagrams showing the construction of the image processing unit 205.

The CCD sensor 204 shown in FIG. 7 converts the document image into electric signals separated into respective colors of R, G, and B in accordance with the intensity of the light reflected from the surface of the document. The reading resolution of the CCD sensor 204 can be switched among 400 dpi, 600 dpi, 800 dpi, 1200 dpi, etc. An AD conversion unit 401 converts analogue signals outputted from the CCD sensor 204 into 8-bit digital data of 256 gradations for the R, G, and B information, based on a timing signal outputted from a reference drive pulse generation unit 411.

A shading correction unit 402 corrects the R, G, and B image data, to eliminate uneven light in the main scanning direction thereof. For the shading correction, data obtained by reading the shading correction plate 206 for each color is independently stored in an internal shading memory as reference data. To be more specific, the correction can be accomplished by converting reciprocally the reference data and multiplying the reciprocally converted data and the image data together when the document is scanned.

A line interval correction unit 403 aligns the reading position in the scanning direction of sensor chips of respective colors, R, G, and B, by delaying the image data of each color in line units using the internal field memory, in accordance with the scanning speed.

Due to the color difference phenomenon caused by an optical lens, the R, G, and B reading phase difference increases more as closer to the edge part of the document on the main scanning side. This may cause not only color aberration but also a misjudgment in an ACS judgment that is described later. In view of this, a color difference correction unit 404 corrects the R, G, and B phase difference based on chroma information.

A variable magnification/moving control unit 405 performs magnification/moving processing in the main scanning direction by using two magnification line memories for each of the R, G, and B image data and alternately inputting and outputting each one line while independently controlling the read/write timing. To be more specific, the variable magnification/moving control unit 405 accomplishes reduction by culling data when writing it to memory, and enlargement by diluting data when reading it from memory. In these controls, to prevent image loss and to decrease image coarseness, the variable magnification/moving control unit 405 performs an interpolation process on the data before writing it to memory for reduction and after reading it from memory for enlargement. These block control and scan control are combined not only for reduction and enlargement, but also for centering, image repeat, bound reduction, and the like.

A histogram generation unit 412 generates brightness data from the R, G, and B image data obtained by a preliminary scan, prior to operation for copying the document. The histogram generation unit 412 then generates a histogram of the brightness data in memory. An automatic color selection (ACS) judgment unit 413 judges whether each dot is a color dot or not with reference to the chroma data. The ACS judgment unit 413 then generates, in memory, information showing the number of color dots in each 512*512 dot square mesh on a document. Based on the generated information, the ACS judgment unit 413 performs a copy background level automatic control (AE process) and a color or monochrome copy operation automatic color selection (ACS process).

A line buffer unit 414 has a memory that can store one line of the R, G, and B image data read by the image reading unit 200. The line buffer unit 414 monitors image data used for image analysis for automatic sensitivity correction of the CCD sensor 204 and automatic clamp correction of the AD conversion unit 401.

An HVC conversion unit 421 once converts the R, G, and B image data inputted via a data selector 422, into brightness (V data) and color difference signals (Cr and Cb data) via 3*3 matrix calculation.

Next, an AE processing unit 423 corrects the V data based on the above mentioned background level control value, and the Cr and Cb data in accordance with the chroma level and the hue level set on the control panel. Following this, an inverse HVC conversion unit 424 converts the V data and the Cr and Cb data back into the R, G, and B image data via 3*3 inverse matrix calculation.

In a color correction unit 430 shown in FIG. 8, a LOG correction unit 431 first converts the R, G, and B data into density data (DR, DG, and DB data), and then a black extraction unit 432 detects the smallest color level of the DR, DG, and DB data as document background components, and also detects the gradient level difference between the maximum color and minimum color of DR, DG, and DB as document chroma data.

A masking calculation unit 433 then performs a 3*6 nonlinear matrix calculation process on the DR, DG, and DB data, to convert the data into color data (C, M, Y, and K data) matching the color toner of the printer.

A UCR/BP processing unit 434 calculates the UCR/BP coefficients corresponding to the document chroma data for the document background components (Min(R, G, B)), and determines the UCR/BP amount by a multiple process. The UCR/BP processing unit 434 then subtracts an amount of under color removal (UCR) from the C, M, and Y data after the masking calculation, and calculates the C, M, and Y data and the K data (BP amount). Also, a monochrome data generation unit 435 generates the brightness component from the R, G, and B data and performs the LOG correction on the brightness component, to output the black data (DV data). Finally, a color data selection unit 436 selects the C, M, Y, and K data for a color copy image, and the DV data (C, M, and Y are white) for a monochrome copy image.

An area judgment unit 440 judges, based on the R, G, and B image data inputted via the data selector 422, whether each pixel included in the image data is in a halftone-dot area or not. It should be noted here that although the area judgment unit 440 actually judges whether each pixel is in various other areas besides a halftone-dot area (such as an edge area of a character), such judgments that are particularly not related to the present invention are not described in this specification. Accordingly, the area judgment unit 440 is hereafter assumed to only judge whether a pixel is in a halftone-dot area, and an area judgment signal S5 is hereafter referred to as a halftone-dot judgment signal S5. The construction of the area judgment unit 440 is described later.

An image correction unit 451 performs image correction processing such as edge enhancement and smoothing on the C, M, Y, and K data outputted from the color correction unit 430 as necessary, based on the halftone-dot judgment signal S5 outputted from the area judgment unit 440. In present embodiment, the image correction unit 451 is assumed to perform smoothing on a pixel that is judged to be in a halftone-dot area, and other image processing is not described. Note that smoothing is one example of image correction processing suitable for pixels in a halftone-dot area.

The image correction unit 451 then performs image correction processing on the C, M, Y, and K data in accordance with sharpness, color balance, and gamma level designated on the control panel. Then, the image correction unit 451 transmits the gradation reproduction attribute signals (-LIMOS) to a print image control interface 453. Also, the image correction unit 451 transmits the C, M, Y, and K data to an image interface unit 462 via a data selector 461 shown in FIG. 7.

The image interface unit 462 inputs and outputs image data, to and from an external device. The image interface unit 462 enables the R, G, and B data to be inputted and outputted at the same time and also, the C, M, Y, and K data to be inputted and outputted sequentially. The image interface unit 462 thereby enables the external device to utilize the scanner function and the printer function of the copying machine 1.

(3) Construction of the Area Judgment Unit 440

Figure 9:
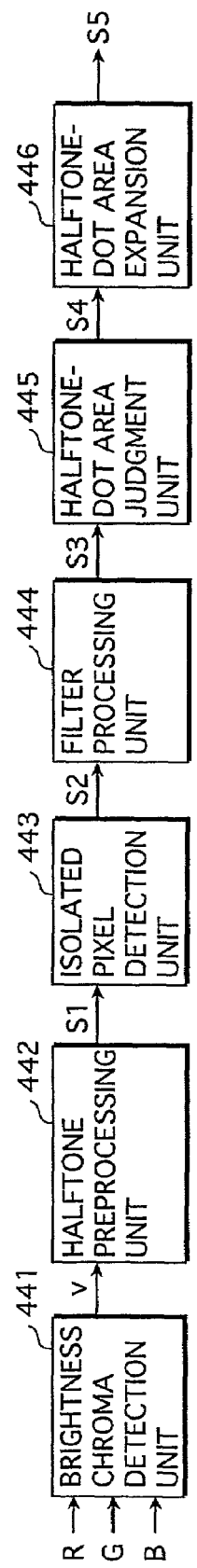
FIG. 9 schematically shows the construction of an area judgment unit 440.

FIG. 9 schematically shows the construction of the area judgment unit 440. As described above, components that are not related to the present invention (for example, components that realize the above-mentioned other judgments such as judgments of an edge area of a character or a color area) are not shown in the figure. The area judgment unit 440 judges whether a target pixel is in a halftone-dot area or not, based on the R, G, and B image data, and outputs a halftone-dot judgment signal S5 indicating its judgment result to the image correction unit 451. The image correction unit 451 performs image correction processing such as smoothing on the C, M, Y, and K data outputted from the color correction unit 430 as necessary, based on the halftone-dot judgment signal S5.

The area judgment unit 440 includes a brightness chroma detection unit 441, a halftone preprocessing unit 442, an isolated pixel detection unit 443, a filter processing unit 444, a halftone-dot area judgment unit 445, and a halftone-dot area extension unit 446. The halftone-dot area extension unit 446 outputs the halftone-dot judgment signal S5. The following describes the operations of each unit included in the area judgment unit 440 in detail.

The brightness chroma detection unit 441 subjects the R, G, and B image date (reflected light data) to color space conversion, so as to generate chroma data and brightness data (V). It should be noted that chroma data is not described in detail in the present embodiment The halftone preprocessing unit 442 subjects image data to such processing that decreases a size of a halftone-dot included in the image data in accordance with the resolution of the image data, so as to be detectable by the isolated pixel filter. To be more specific, the halftone preprocessing unit 442 subjects the brightness data (V) to a pixel culling process so as to decrease the number of pixels. The construction of the halftone preprocessing unit 442 and the like is not described here as it is well known and is disclosed in the U.S. patent application Ser. No. 09/369,176, which is incorporated herein by reference. Due to this pixel culling process, even when the image data has high resolution such as 600 dpi, the size of a halftone-dot can be decreased to a size detectable by the same isolated pixel filter used, for example, when the image data has resolution of 400 dpi.

The isolated pixel detection unit 443 judges whether a target pixel corresponds to an isolated pixel or not, based on comparison results of (a) brightness data of the target pixel and (b) brightness data of nearby pixels. To be more specific, the isolated pixel detection unit 443 sets a filter of 5*5 pixels as an isolated pixel filter (see FIG. 1) as described in the case of conventional technique, and judges whether the target pixel corresponds to an isolated pixel, by judging whether the above conditions: inequality (1); inequality (2); and inequality (3), are satisfied or not.

For example, when one of the above conditions: inequality (1); inequality (2); and inequality (3), is satisfied, the target pixel can be judged to correspond to a white isolated pixel. To judge whether the target pixel corresponds to a black isolated pixel or not, the above inequalities (1), (2), and (3) in each of which the sign is inversed and MAX (maximum value) is replaced by MIN (minimum value) can be used. Note that all of the inequalities (1), (2), and (3) may not necessarily be satisfied, but the target pixel may be judged to correspond to an isolated pixel when at least one of the inequalities (1), (2), and (3) is satisfied. Alternatively, the target pixel may be judged to correspond to an isolated pixel when the inequalities (1) and (3) are satisfied. Various other judgment methods can be considered, such that a logical-OR of results of the inequalities (1) and (2) is taken and the target pixel is judged to correspond to an isolated pixel when one of the inequalities (1) and (2) is satisfied and the inequality (3) is satisfied.

The filter processing unit 444 performs predetermined filter processing on an output (hereafter referred to as an "isolated pixel signal") S2 of the isolated pixel detection unit 443, and corrects the isolated pixel signal S2. As described above, when the isolated pixel signal S2 is "high", the target pixel is tentatively judged to correspond to an isolated pixel. However, if this isolated pixel signal S2 without any correction is used for judging whether the target pixel is in a halftone-dot area or not based on the number of isolated pixels in a predetermined area, a misjudgment may occur when an extremely small-sized character is present in the predetermined area. To avoid this misjudgment, the correction of the isolated pixel signal S2 is performed.

FIG. 10 shows specific examples of filters provided in the filter processing unit 444. The figure shows filters of 11 patterns (11 conditions), in each of which a pixel positioned at the upper left corner out of 3*3 pixels corresponds to a correction target pixel, and the isolated pixel signal for each pixel being "high (1)" or "low (0)" is indicated. When the isolated pixel signal for 3*3 pixels including the present correction target pixel at the upper left corner matches one of the eleven patterns, the filter processing unit 444 sets the isolated pixel signal S3 for the present correction target pixel at "high (1)" and outputs the isolated pixel signal S3 being "high (1)". When the isolated pixels signal for the 3*3 pixels including the present correction target pixel at the upper left corner does not match any of the eleven patterns, the filter processing unit 444 corrects the isolated pixel signal S2 for the present correction target pixel, if having been set at "high", to be "low (0)", and outputs the isolated pixel signal S3 being "low (0)". To realize this processing, the filter processing unit 444 in the present embodiment includes a storage unit that can at least store values of the isolated pixel signal S2 corresponding to three lines. It should be noted here that the storage unit can take any construction.

Here, the following describes the filters shown in FIG. 10 in more detail. As one example, the condition (1) is assumed to be satisfied in the following case. The isolated pixel signal S2 is "low" for the correction target pixel, and "high" for 2*2 pixels (four pixels in total) positioned in a group at the lower right with respect to the correction target pixel. In this case, the filter processing unit 444 outputs the isolated pixel signal for the correction target pixel being corrected to be "high". On the other hand, when the isolated pixel signal S2 is "low" for pixels that are positioned three-line below the correction target pixel and for pixels that are positioned three-line right the correction target pixel (these pixels being positioned outside but adjacent to the filter area of the 3*3 pixels), the isolated pixel signal for pixels other than (a) the correction target pixel and (b) the pixel positioned at the lower right corner in the condition (1) is corrected to be "low", and then outputted. This can decrease the number of isolated pixels when the isolated pixels are positioned continuously (i.e. when isolated pixels are positioned in a group). This filter processing, therefore, also enables the number of isolated pixels to decrease when a group of isolated pixels in an extremely small-sized character is present. Further, due to the filter processing, the number of isolated pixels in a halftone-dot area including a large-sized halftone-dot decreases. This narrows the difference in the number of isolated pixels between (a) a halftone-dot area including a large-sized halftone-dot and (b) a halftone-dot area including a small-sized halftone-dot, while the detected number of isolated pixels in an extremely small-sized character decreases further. By setting an appropriate threshold, therefore, pixels in a character become less likely to be misjudged as pixels in a halftone-dot area.

Also, in the present embodiment, the isolated pixel signal "high" for the correction target pixel is outputted without being corrected when few pixels whose isolated pixel signal is "high" are positioned near the correction target pixel, as can be seen particularly in the conditions (2), and (9) to (11). This is effective in a case where a size of a halftone-dot in a halftone-dot area is small (like when each halftone-dot consists of one pixel).

The halftone-dot area judgment unit 445 sets a window of a predetermined size (for example, 9 (vertical)*45 (horizontal) pixels) with a target pixel as the center, and counts the number of white isolated pixels or black isolated pixels present within the window, based on an output signal (the corrected isolated pixel signal) S3 of the filter processing unit 444. The halftone-dot area judgment unit 445 compares the greater one of the count numbers of white isolated pixels and black isolated pixels, with a preset threshold. The halftone-dot area judgment unit 445 sets an output signal S4 at "high" when the number of isolated pixels is above the threshold, and sets the output signal S4 at "low" in the other cases. The output signal being "high" indicates that the target pixel is judged to be in a halftone-dot area.

Figure 11:
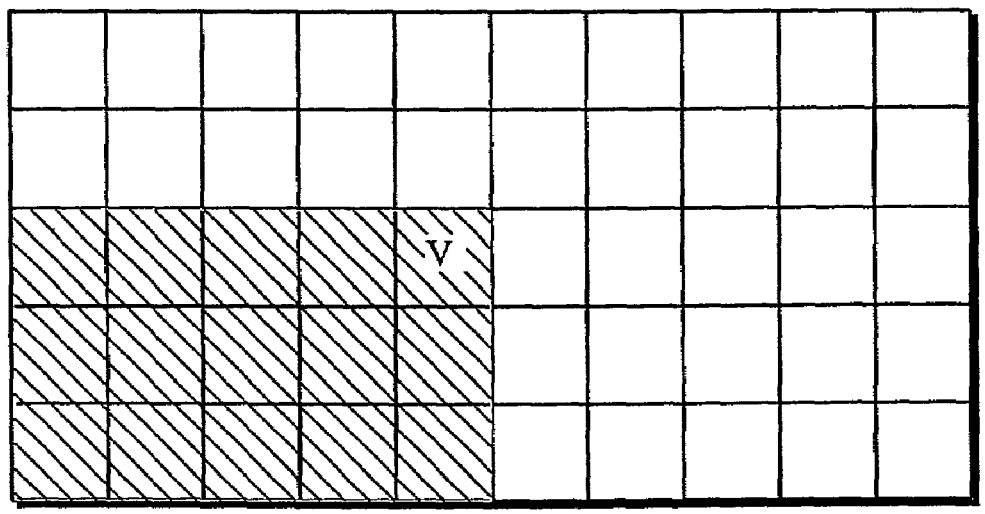
FIG. 11 is a drawing for explaining an expansion process of a halftone-dot area.

The halftone-dot area extension unit 446 performs an extension process of a halftone-dot area, based on the output signal S4 of the halftone-dot area judgment unit 445. This extension process aims 'to prevent a misjudgment as to whether a target pixel is in a halftone-dot area or not, a specific example of which is shown in FIG. 11. In FIG. 11, a shaded part is a halftone-dot area and a target pixel V is positioned at a corner of the halftone-dot area. In such a case, a count value by the halftone-dot area judgment unit 445 can be below a predetermined threshold despite the fact that the target pixel V is in a halftone-dot area.

To be more specific, the halftone-dot area extension unit 446 sets a window of a predetermined size with the target pixel as the center. When a pixel at a predetermined position within the window (hereafter referred to as a "reference pixel") is judged to be in a halftone-dot area, the halftone-dot area extension unit 446 judges that the target pixel is in the halftone-dot area as well. A pixel at any appropriate position can be set as a reference target. In this setting, however, the width of a window for use in the halftone-dot area extension process, image resolution, and the like should be taken into consideration. The halftone-dot area extension process may be performed with only one reference pixel. However, it is more preferable to (a) set a plurality of reference pixels surrounding a target pixel in a plurality of directions with a certain distant therefrom, (b) take a logical-OR of these set reference pixels, and (c) judge that the target pixel is in a halftone-dot area when one of the plurality of reference pixels surrounding the target pixel is in the halftone-dot area.

The above processing performed by the halftone-dot area extension unit 446 results in a halftone-dot judgment signal S5 finally being outputted. The output signal S5 being "high" indicates that the target pixel is in a halftone-dot area, whereas the output signal S5 being "low" indicates the other cases.

The halftone-dot judgment signal S5 generated as described above is inputted into the image correction unit 451, and image correction processing described later is performed based on the input signal. In the present embodiment, smoothing is performed on a pixel in a halftone-dot area, as one example of suitable image correction processing.

(4) Considerations of the Effect Produced by the Filter Processing Unit 444

Figure 12A:
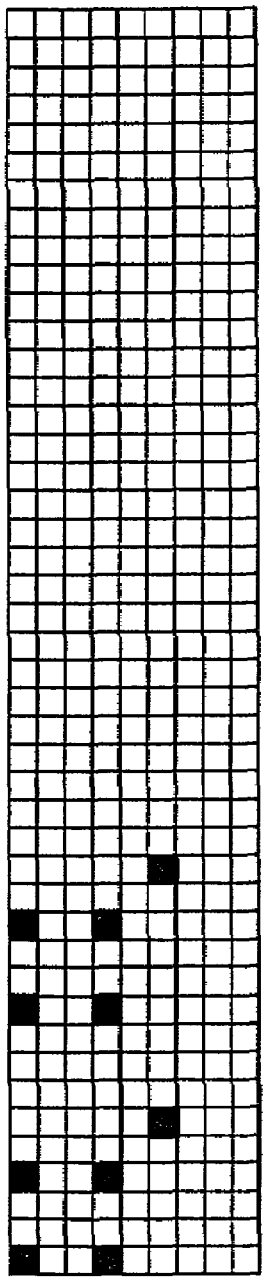
FIGS. 12A and 12B are drawings for explaining the effect produced by the filter processing unit 444.
Figure 12B:
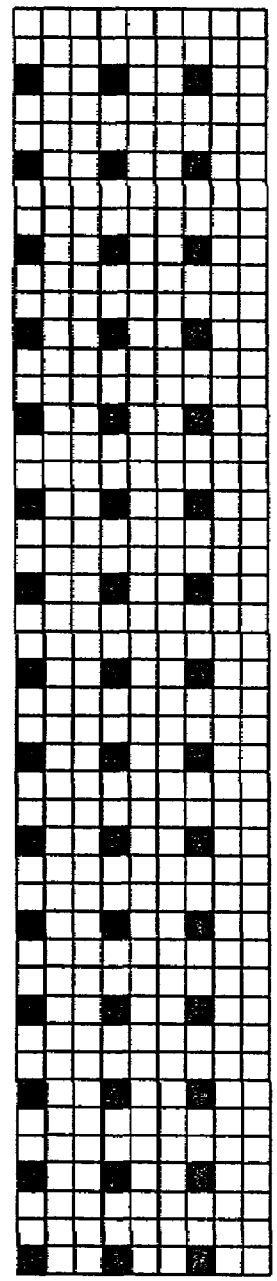

The following describes the effect produced by the filter processing unit 444, with reference to FIGS. 12A and 12B.

Figure 3A:
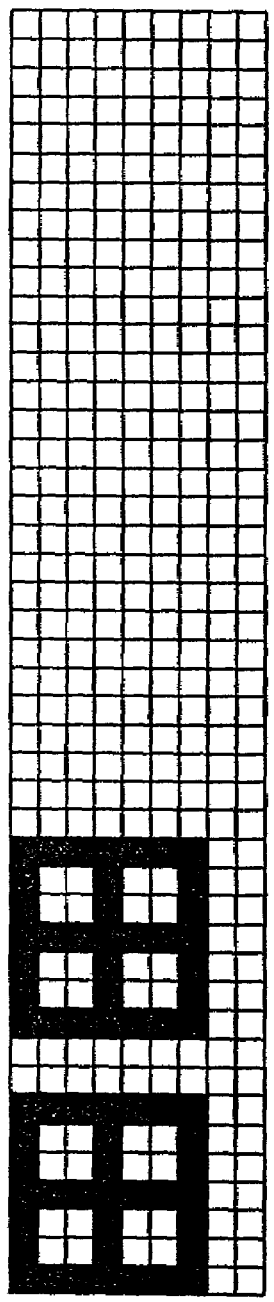
FIGS. 3A and 3B are drawings for explaining the problem to be resolved by the present invention.
Figure 3B:
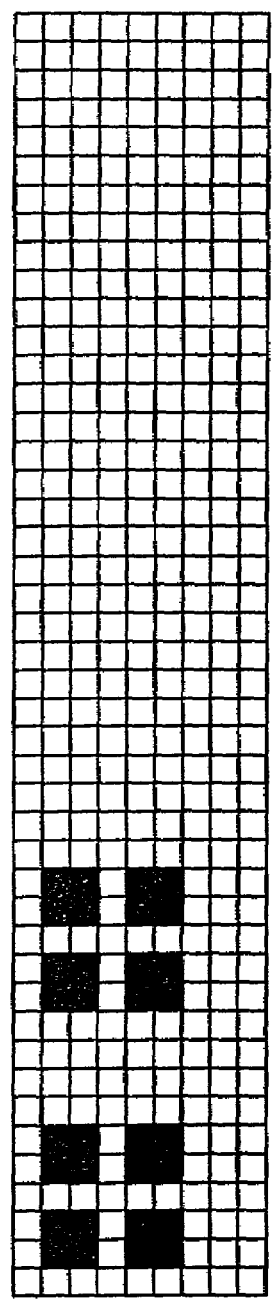
Figure 4A:
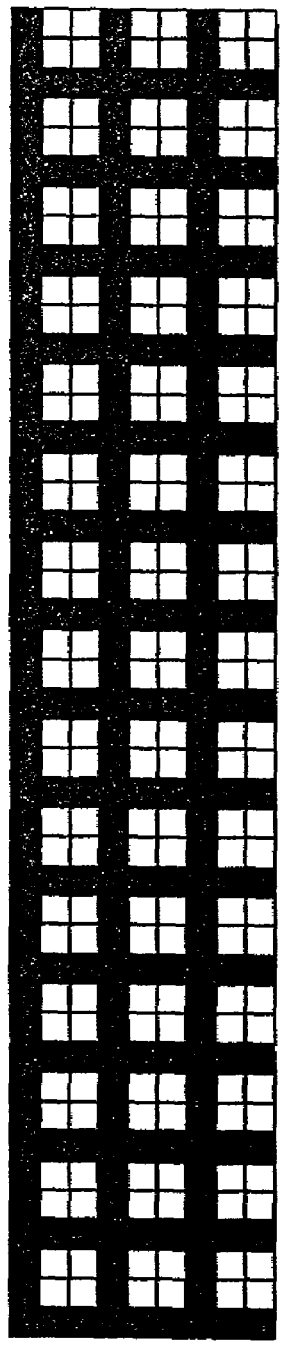
FIGS. 4A and 4B are drawings for explaining the problem to be resolved by the present invention.
Figure 4B:
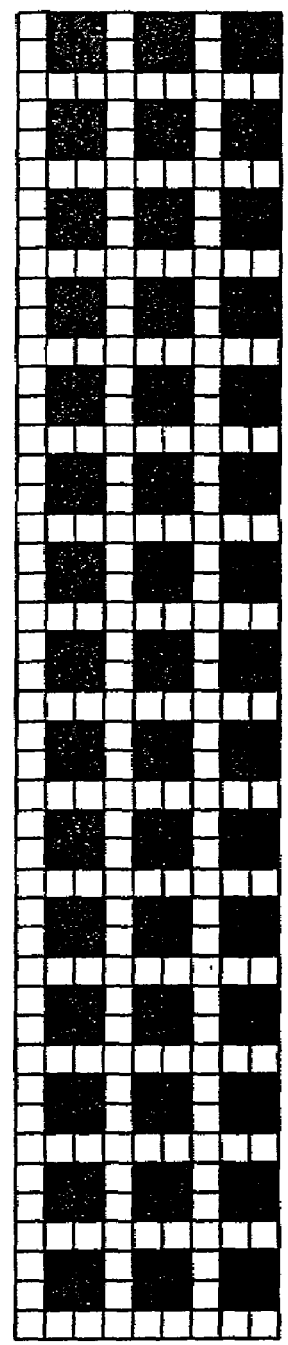

FIG. 12A shows an example of the filter processing applied to isolated pixel judgment results of the case shown in FIG. 3B. FIG. 12B shows an example of the filter processing applied to isolated pixel judgment results of the case shown in FIG. 4B.

Figure 5A:
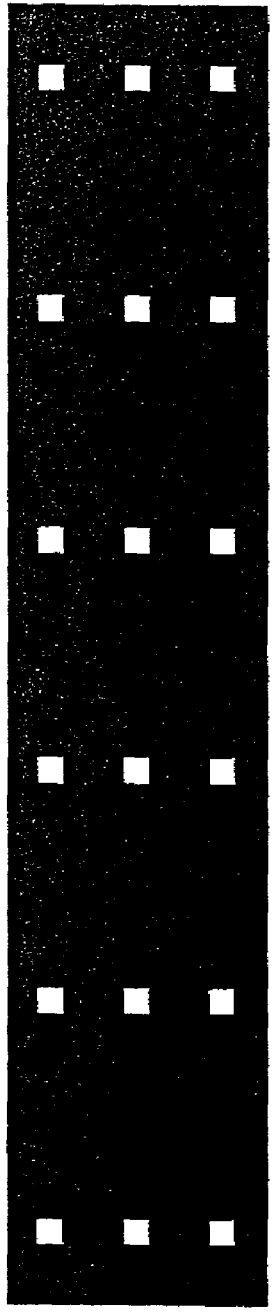
FIGS. 5A and 5B are drawings for explaining the problem to be resolved by the present invention.
Figure 5B:
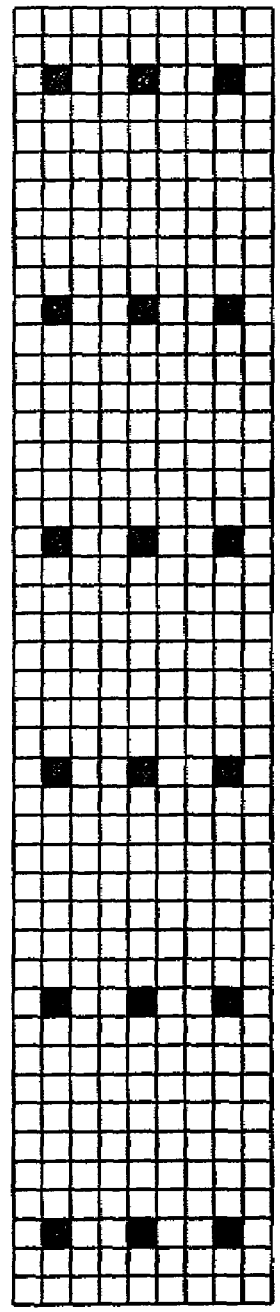

In the example of FIG. 12A, the number of isolated pixels is 32 before the correction described above but is decreased to be 10 after the correction. In the example of FIG. 12B, the number of isolated pixels is 180 before the correction described above but is decreased to be 45 after the correction. Referring now to the examples of FIGS. 5A and 5B, the number of isolated pixels in FIG. 5B is 18. Accordingly, by setting a threshold of the number of isolated pixels used to judge whether a target pixel is in a halftone-dot area or not in a range of 11 to 18, pixels become less likely to be misjudged. Misjudgments to be resolved here include that pixels that are actually in an extremely small-sized image of a character "TA" are judged to be pixels in a halftone-dot area or that pixels that actually constitute halftone-dots shown in FIG. 5A are judged not to be pixels in a halftone-dot area.

Figure 2:
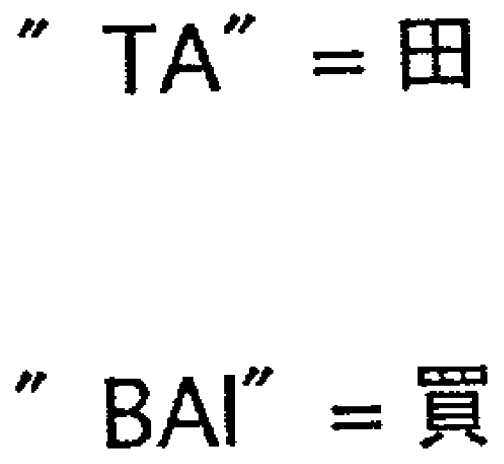

As described above, correction of the isolated pixel signal according to the present embodiment can decrease the detected number of isolated pixels in a character, for example, when isolated pixels in character images such as extremely small-sized images of characters with the Kanji attribute "TA" and "BAI" (respectively meaning "rice field" and "to purchase" in Japanese (see FIG. 2)) are detected. Therefore, such a misjudgment that a pixel that is actually in a character is judged to be a pixel in a halftone-dot area can be decreased. This results in decreasing deterioration of image quality caused by unnecessarily performed image correction processing such as smoothing.

(Modifications)

It should be noted that the above embodiment describes the case where a filter of 5*5 pixels shown in FIG. 1 is used as an isolated pixel filter and filters of 3*3 pixels (11 patterns) are used by the filter processing unit 444. For example, when a size of an isolated pixel filter is increased so as to detect a larger isolated pixel, it is preferable to increase sizes of filters used by the filter processing unit 444 as well. In such a case, filter patterns may not be limited to the 11 patterns shown in FIG. 10, but a greater number of filter patterns may be used, or the filter patterns may be made more complicated. In such a case, too, the present invention is applicable by examining such patterns that prevent misjudgments by correcting the isolated pixel signal.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
an acquisition unit for acquiring image data that includes a plurality of pixels;
a first-judgment unit for setting each of the plurality of pixels as a first target pixel and performing a first-judgment as to whether the first target pixel is an isolated pixel for a judgment of a halftone-dot area;
a first-judgment result correction unit for correcting results of the first-judgment, to determine isolated pixels to be used in a second-judgment; and
a second-judgment unit for setting each of the plurality of pixels as a second target pixel and performing the second-judgment as to whether the second target pixel is in a halftone-dot area, by referring to the corrected results of the first-judgment.

2. The image processing apparatus of claim 1,
wherein the second-judgment unit counts a number of isolated pixels determined to be used in the second-judgment, in a predetermined area including the second target pixel, by referring to the corrected results of the first-judgment, and compares the count number and a predetermined threshold, to judge whether the second target pixel is in a halftone-dot area.

3. The image processing apparatus of claim 1,
wherein the first-judgment result correction unit corrects a result of the first-judgment relating to the first target pixel, by referring to results of the first-judgment relating to a plurality of pixels present at predetermined positions with respect to the first target pixel.

4. The image processing apparatus of claim 3,
wherein when the first-judgment unit judges that a plurality of pixels positioned in a group are isolated pixels, the first-judgment result correction unit performs such correction processing that decreases a number of isolated pixels to be used in the second-judgment.

5. The image processing apparatus of claim 1,
wherein the first-judgment result correction unit includes a filter with a predetermined pattern that is used when correcting the results of the first-judgment.

6. The image processing apparatus of claim 1, further comprising
an image correction unit for correcting the image data, in accordance with results of the second-judgment.

7. The image processing apparatus of claim 6,
wherein when the second-judgment unit judges that the second target pixel is in a halftone-dot area, the image correction unit performs, on the second target pixel, image correction processing suitable for a pixel in a halftone-dot area.

8. The image processing apparatus of claim 6, further comprising
a halftone-dot area extension unit for extending a halftone-dot area that is composed of pixels whose judgment results of the second-judgment unit are affirmative, wherein the image correction unit corrects a part of the image data that corresponds to the halftone-dot area extended by the halftone-dot area extension unit.

9. An image forming apparatus, comprising:
an acquisition unit for acquiring image data that includes a plurality of pixels;
a first-judgment unit for setting each of the plurality of pixels as a first target pixel and performing a first-judgment as to whether the first target pixel is an isolated pixel for a judgment of a halftone-dot area;
a first-judgment result correction unit for correcting results of the first-judgment, to determined isolated pixels to be used in a second-judgment;
a second-judgment unit for setting each of the plurality of pixels as a second target pixel and performing the second-judgment as to whether the second target pixel is in a halftone-dot area, by referring to the corrected results of the first-judgment;
an image correction unit for correcting the image data in accordance with results of the second-judgment; and
an image forming unit for forming an image based on the image data corrected by the image correction unit.

10. An image processing method, comprising:
an acquisition step for acquiring image data that includes a plurality of pixels;
a first-judgment step for setting each of the plurality of pixels as a first target pixel and performing a first-judgment as to whether the first target pixel is an isolated pixel for a judgment of a halftone-dot area;
a first-judgment result correction step for correcting results of the first-judgment, to determine isolated pixels to be used in a second-judgment; and
a second-judgment step for setting each of the plurality of pixels as a second target pixel and performing the second-judgment as to whether the second target pixel is in a halftone-dot area, by referring to the corrected results of the first-judgment.

11. The image processing method of claim 10,
wherein in the first-judgment result correction step, a result of the first-judgment relating to the first target pixel is corrected by referring to results of the first-judgment relating to a plurality of pixels present at predetermined positions with respect to the first target pixel.

12. The image processing method of claim 10, further comprising
an image correction step for correcting the image data, in accordance with results of the second-judgment.

* * * * *